United States Patent [19]

Michnowski

[11] Patent Number: 4,832,971

[45] Date of Patent: * May 23, 1989

[54] NUTRITIONAL ATHLETIC BAR

[75] Inventor: Jane Michnowski, Little Ferry, N.J.

[73] Assignee: Nabisco Brands, Inc., Parsippany, N.J.

[*] Notice: The portion of the term of this patent subsequent to Sep. 24, 2002 has been disclaimed.

[21] Appl. No.: 724,552

[22] Filed: Apr. 18, 1985

Related U.S. Application Data

[63] Continuation of Ser. No. 480,438, Mar. 30, 1983, Pat. No. 4,543,262.

[51] Int. Cl.$^4$ ............................................. A23G 3/00
[52] U.S. Cl. .................................... 426/302; 426/72; 426/74; 426/103; 426/306; 426/512; 426/656; 426/660
[58] Field of Search ............... 426/72, 93, 96, 103, 426/293, 618, 660, 516, 804, 808, 648, 658, 305, 307, 309, 810, 560, 302, 306, 512, 74, 686

[56] References Cited

U.S. PATENT DOCUMENTS

| | | | |
|---|---|---|---|
| 4,038,423 | 7/1977 | Hayward et al. | 426/103 |
| 4,055,669 | 10/1977 | Kelly et al. | 426/307 |
| 4,296,141 | 10/1981 | de Paolis | 426/660 |
| 4,451,488 | 5/1984 | Cook et al. | 426/639 |
| 4,543,262 | 9/1985 | Michnowski | 426/306 |

FOREIGN PATENT DOCUMENTS 2201041  4/1974  France ................. 426/660

*Primary Examiner*—Marianne Cintins
*Attorney, Agent, or Firm*—Richard Kornutik

[57] ABSTRACT

A high protein, low or no lactose, vitamin and mineral fortified nutritionally balanced snack is composed of a corn syrup, a confectioner's coating material which is normally solid at room temperature, a wetting agent, a vitamin and mineral premix, at least one high carbohydrate content source and at least one high protein content source. Each bar contains less than approximately 10% by weight water and has a shelf life of at least approximately six to twelve months. The nutritional bars are extruded with no cooking being necessary and thus the vitamins and minerals retain their high potency. The confectioner's coating is distributed substantially uniformly throughout the extrudate and provides integrity to the shape of the snack. The bar is packaged in a foil laminate film packing which can be flushed with an inert gas before sealing in order to substantially eliminate the oxygen content in the sealed packages.

15 Claims, No Drawings

NUTRITIONAL ATHLETIC BAR

CROSS-REFERENCES TO RELATED APPLICATIONS

This is a continuation of U.S. Application Ser. No. 480,438, filed Mar. 30, 1983, now U.S. Pat. No. 4,593,262.

BACKGROUND OF THE INVENTION
1. Field of the Invention

The present invention relates to a high protein, low lactose quick energy nutritionally-balanced snack which is fortified with vitamins and minerals and to a method of making the snack.
2. Description of the Prior Art There has been a new awareness for the need of eating proper foods to assure consumption of all the necessary vitamins and minerals as specified in the recommended daily allowance disclosed by the U.S. Government.

In order to help meet nutritional necessities, nutritional bars were introduced which provided a portion of the minerals and vitamins, and incorporated carbohydrates to yield quick energy when consumed. However, many of these nutritional bars contain milk products from which lactose intolerance stems. Other problems with prior art bars result from the fact that cooking is required to achieve shelf stability or shape integrity. For example, vitamins A, B, C and D become unstable and disintegrate upon cooking, resulting in a bar of reduced nutritional value.

U.S. Pat. No. 3,814,819 teaches a protein fortified food bar composed of several baked crisp wafers stacked one above the other with a creamy filling between them. The creamy filling contains added vitamins and minerals. Each serving provides 25% of the recommended daily allowance of high quality proteins, vitamins and minerals. The caloric content is about 200 to 250 calories per serving.

U.S. Pat. No. 3,434,843 discloses a food product which contains a homogeneous distribution of caloric and proteinaceous requirements. The food piece contains a continuous external phase of hydrophilic film former, water, and edible humectant. The external phase encapsulate an internal phase of fat globules. The dispersion is stabilized by refrigeration or molding followed by drying.

U.S. Pat. No. 3,058,828 discloses a protein fortified food product for use in survival situations which includes 26 to 32% non-fat dry milk solids, sugar, chocolate flavor, and methyl cellulose. The vitamins and minerals for the food product are packaged separately from the food product.

U.S. Pat. No. 3,185,574 discloses a high protein wafer-like baked piece containing sufficient carbohydrate, protein, and fat to provide a balanced diet. The vitamins can be added during the creaming stage or to the creamed mixture. Water is used as the chief dough lubricant.

U.S. Pat. No. 3,901,799 discloses a high protein chocolate snack containing 30 to 50% by weight chocolate. Caseinates and peanut butter are added to a mixture of milk chocolate, dark chocolate, and cocoa butter when the mixture is at a temperature of between 80° F. and 100° F. The peanut butter and caseinates are then mixed into the melted chocolate phase. The resulting product may be molded or extruded. Vitamins which are compatible with the ingredients. the snack, it is disclosed, can be added.

U.S. Pat. No. 3,431,112 discloses a nutritional food bar which contains a binder comprising a discontinuous phase of fat globules encapsulated by a continuous phase of water and a hydrophilic film former. Modifiers, such as lactose, can be added to the film former, it is disclosed. The product is formed by molding at pressures of from about 25 to 1000 p.s.i.

The present invention provides a low moisture shelf stable nutritional snack which can be produced by extrusion without cooking, which can supplement one's dietary intake with 25% of the recommended daily allowance of all of the vitamins and minerals set forth in the recommended daily allowances by the U.S. Department of Agriculture and which yields instant energy. The snack exhibits shape integrity in spite of its low moisture content and uncooked or unbaked state. The snack has a minimum amount of milk products so persons with milk allergies can also benefit from the product. Further, it has pleasing textural and taste characteristics and an overall sense of freshness and moistness.

SUMMARY OF THE INVENTION

The present invention provides a high protein, low milk or milk products nutritional snack that is capable of both providing quick energy and supplementing one's dietary intake to include at least 25% of the recommended daily allowance of all vitamins and minerals as set forth by the U.S. Department of Agriculture. A low lactose content of less than about 1.5% by weight, based upon the weight of the serving, substantially eliminates allergic reactions caused by lactose intolerance.

The ingredients are of low moisture content so that baking or cooking or heating of the nutritional snack is not necessary. Destruction of heat-sensitive vitamins or minerals is thereby avoided. Additionally, energy requirements and processing times are reduced in the process of the present invention. The snack has a low moisture content of less than about 10% by weight, yet is chewy and moist tasting. It is shelf-stable for at least 6 to 12 months under non-refrigerated conditions.

A confectioner's coating material, which is normally solid at room temperature is distributed substantially uniformly throughout the snack. The confectioner's coating material, being solid at room temperature, provides shape integrity to the snack and aids in binding the ingredients together. It also serves to distribute flavoring throughout the low moisture content product. The snack is also preferably surface coated with the confectioner's coating material to enhance product integrity and to enhance visual appeal and taste.

The nutritional snack of the present invention is balanced nutritionally. It has a caloric distribution of at least 10% from protein, preferably at least 15% from protein, at least 45% from carbohydrate, preferably about 50% to about 60%, and about 25% to about 35%, preferably about 30% to about 32% from fat, said percentage adding up to 100% and being based upon the total calories of the final product or serving. The nutritional snack is preferably in bar form having about 290 to about 320 calories per 71 gm serving. The sucrose content is preferably less than or equal to a 16% contribution to the total calories.

The process for preparing the nutritional snack of the present invention comprises melting the confectioner's compound coating, admixing it with the remaining liquid ingredients, the minor dry ingredients and the major dry ingredients to obtain a substantially homogeneous mixture and cutting the extrudate into pieces. Admixing the vitamins and minerals with the mixed liquids prior to adding of the major dry ingredients assures avoidance of "hot spots" or local concentrations of vitamins or minerals in the final product. The confectioner's coating material comprises from about 5% to about 25% by weight, preferably about 8% to about 20% by weight, of the extrudate. Neither drying nor external pressures are needed to obtain form integrity of the extrudate.

DETAILED DESCRIPTION OF THE INVENTION

The attainment of at least 6 to 12 month shelf stability under non-refrigerated conditions in the nutritionally balanced snack of the present invention is assured by using ingredients having a low moisture content. The ingredients used and their amounts should be such that the total water content, based upon all of the ingredients, is less than about 10%, preferably about 7% to about 9% by weight. At these low moisture contents, heating is not required to remove water to achieve a shelf stable water activity in the final product. A water activity of less than or equal to about 0.70 is considered shelf stable.

The shelf-stability of the nutritional snacks of the present invention is inclusive of preservation of the vitamin and mineral premix, protein and texture preservation, as well as a lack of microbial growth. It is well known that cooking destroys microorganisms, but it also destroys or disintegrates certain vitamins and minerals. For example, vitamins A, C, and D degrade upon cooking. Vitamins that are coated can withstand high temperatures up to about 160° F. to 180° F. However, cooking for any period of time will result in a less potent vitamin. Thus, in order to preserve the vitamins and minerals to the fullest extent possible, it is necessary to avoid heating above a temperature of 160° F. The only heating needed in the production of the nutritional snacks of the present invention is for melting the confectioner's coating material. However, incorporation of the melted confectioner's coating into the nutritional snack does not entail subjecting the vitamins or minerals to temperatures which would result in their substantial degradation.

In addition to the limitation on moisture content, ingredients chosen should not require cooking, baking, or other heating of the ingredients after incorporation of the vitamins and minerals to obtain a palatable, chewy, shelf-stable product. Thus, cooking or other heating of the ingredients is not needed during or after extrusion of the ingredients. However, a slight amount of heating or cooking, under 160° F. is within the limits of the present invention. For example, some water removal can be achieved by drying at temperatures below 160° F. to obtain a desired moisture content. This heating, however, is undesirable. It increases energy costs, and subjects the vitamins and minerals to degradation. Additionally, the initial presence of this excess moisture subjects the vitamins and minerals, as well as their coatings to degradation.

Commercially available confectioner's coating materials which are normally solid at room temperature, but which melt or become pourable at temperatures preferably below about 140° F., more preferably below about 105° F., can be used in the nutritional snacks of the present invention. The higher the melting or pouring point of the coating material, the greater is the risk that the heated coating material will increase in viscosity or partially solidify upon admixture with the other, preferably room temperature, ingredients. This premature solidification or thickening would greatly hinder the attainment of a substantially uniform distribution of the coating material throughout the nutritional snack. Distribution of the coating material throughout the snack aids to bind the ingredients together to provide cuttability to the extrudate, product integrity, and reduced crumbliness. The commercially available coating material may be a flavored variety or unflavored. In either case, flavoring ingredients may be added to the melted coating material. The melted compound coating accordingly serves to distribute flavoring substantially uniformly throughout the snack, which may otherwise be a difficult task when making a low moisture content product.

In addition, the higher the melting or pour point of the coating material, the greater the risk that vitamins and minerals will degrade during contact with the heated coating material. As the melting or pour point decreases, the mobility of the coating material increases. This mobility could result in undesirable migration under high temperature storage conditions. Accordingly, it is preferable to use coating materials which are solid at about 90° F. or above but which melt or become pourable below about 105° F.

The confectioner's coating material may be based upon cocoa butter or it may be a compound coating. The latter coating materials are based upon hardened vegetable oils. Compound coatings may be chocolate flavored, vanilla flavored, peanut flavored, coconut flavored, fruit flavored or the like. The principal ingredients in a coating are sugar and a fat. Typical hardened vegetable oils used in coating materials are hydrogenated cottonseed, coconut, soybean, palm, and peanut oils. Mixtures of confectioner's coating materials can be used in the nutritional snacks of the present invention. The compositions of typical coating materials which can be used are disclosed in Matz, *Cookie and Cracker Technology*, AVI Publishing Co., Westport, Connecticut, Page 176, Table 45, (1968) which table is herein incorporated by reference.

The confectioner's coating which is distributed substantially uniformly throughout the extrudate is present in an amount of from about 5% to about 25% by weight, preferably about 8% to about 20% by weight, based upon the weight of the extrudate. At amounts below about 5%, the cuttability of the extrudate, product integrity, and product moistness deteriorate. Inclusion of an additional amount of coating material as a surface coating on the extrudate is preferred to enhance product integrity, provide texture variability, and to minimize moisture migration into or from the extrudate. The amount of melted coating applied as a surface coating typically constitutes about 12% to about 16% by weight of the final product or serving. The total amount of melted coating material or materials used is typically about 20% to about 35% by weight, of the final product or serving.

Many confectioner's compound coatings contain milk or milk products which could result in lactose intolerance in some individuals. Lactose-free coating materials are preferred. A significant number of human beings suffer from lactose intolerance resulting from their consumption of milk or milk products. The nutritional bars of the present invention can be produced with the substantial elimination or complete elimination of milk and milk products. Thus, the nutritional bars of the present invention can be produced with a lactose content of less than or equal to about 1 gm per 71 gm serving or less than or equal to about 1.5% by weight, based upon the weight of the final product. Primarily, milk and milk products are important as a source of calcium and for flavoring. The nutritional bar is supplemented with a vitamin and mineral premix, which contains calcium, and the confectioner's coating material provides flavor thereby eliminating any need for the use of milk or milk products.

The vitamins and minerals are included in the nutritional snacks of the present invention such that at least 25% of the recommended daily allowance as set forth by the U.S. Department of Agriculture is present per serving. The vitamins and minerals may be coated or uncoated. Commercially available vitamin premixes, mineral premixes, or vitamin and mineral premixes, supplemented as needed, can be used. Based upon the weight of the extrudate, the amount of vitamins and minerals is about 3% to about 4% by weight. Many vitamins and minerals have objectionable tastes. The snacks of the present invention preferably contain salt for masking or flavoring purposes. The amount of salt used is suitably about 0.25% to about 0.50% by weight, based upon the weight of the extrudate or core.

The snack of the present invention is nutritionally balanced in providing carbohydrates, proteins, and fats each at significant levels. The snack has a caloric distribution of: protein at least 10%, preferably at least 15%; carbohydrates at least about 45%, preferably about 50% to about 60%; and fat about 25% to about 35%, preferably about 30% to about 32%, said percentages adding up to 100%. By caloric distribution is meant the percent of the total calories of the final product or serving which is contributed by the component or components. By "final product" or "serving" is meant the core (or center), which is the extrudate, plus surface coating on the core, plus any topping on the surface coating. In other words, it is the product as packaged. The percentage of total calories contributed by sucrose is preferably at most about 16% to provide quick energy. High sucrose contents detract from the snack's consumer appeal as a nutritive food product. Based upon a serving size of about 71 gm, the total calories of the nutritional snack should be about 290 to 320 calories, preferably about 300 calories.

Protein fortification is accomplished by supplementing the nutritional bar with edible proteins from at least one high protein content source. Exemplary of high protein content sources which can be used are peanut proteins, which include peanut flours and grits, soy proteins, such as isolates or concentrates, wheat proteins, such as wheat germ, and caseinates, such as potassium, sodium, and calcium caseinate. Based upon the weight of the extrudate, or core, a suitable amount of the at least one high protein content source is about 20% to about 30% by weight. The protein content should be at least about 15% by weight, based upon the weight of the final product.

Carbohydrates are well known as a quick-energy source. Professional athletes, like marathon runners, typically consume large carbohydrate meals the day prior to the marathon (called "starching-up"). Hence, a high percent of carbohydrates is necessary before and during periods of exercise. In the present invention, corn syrup, preferably high fructose corn syrup, is used as a high carbohydrate content source. The corn syrup provides a moist, chewy texture to the mask, provides sweetness, and serves to distribute the dry ingredients. Additionally, the corn syrup in combination with the confectioner's coating material, serves to bind the other ingredients, such as the high protein content and other high carbohydrate content sources together. Suitable amounts of the corn syrup are about 25% to about 30% by weight, based upon the weight of the extrudate.

At least one other high carbohydrate content source is included in the nutritional snack of the present invention. Exemplary of suitable high carbohydrate content sources for providing a caloric distribution within the above ranges are sugars, such as fructose granules, brown sugar, sucrose, and mixtures thereof, and cereal grains such as rice, oats, corn, and mixtures thereof. Preferably, the snack contains at least one sugar and at least one carbohydrate. Based upon the weight of the core, suitable amounts of these ingredients are about 3% to about 10% by weight of at least one sugar, and about 12% to about 18% by weight of at least one cereal grain.

Fats represent the highest source of energy per unit weight. Fats provide long term energy as opposed to the "quick energy" of carbohydrates. Suitable sources of fats, other than the confectioner's coating material, for providing a caloric distribution within the above ranges are: flavorings such as chocolate, cocoa, and coconut, and at least one partially hydrogenated vegetable oil such as soybean oil, cottonseed oil, corn oil, and palm oil. Shortening, other than the confectioner's coating material, is not necessary in the nutritional snacks of the present invention. However, it is preferable to include a liquid wetting agent in a small amount, to facilitate mixing and binding of the dry ingredients with the confectioner's coating material and corn syrup and to enhance moistness and chewiness of the snack. Exemplary of such wetting agents are molasses, honey, and the partially hydrogenated vegetable oils, and mixtures thereof. A suitable amount of the at least one wetting agent is about 2% to 5% by weight, based upon the weight of the extrudate or core. Suitable amounts of the flavoring ingredients range up to about 3% by weight, based upon the weight of the extrudate or core.

Of course, high carbohydrate content sources, useful in the present invention, may also be substantial sources of proteins and/or fats. For example, peanut flour, oats, and wheat germ each provide substantial amounts of proteins, carbohydrates, and fats.

Dietary fiber can be included in the nutritive bar. Fiber consumption helps the digestive tract efficiently regulate bodily waste. Suitable amounts are about 3% to about 8%, preferably about 5% by weight fiber, based upon the weight of the final product. Suitable sources of dietary fiber are folled oats and brans.

The nutritional bar may be topped with conventional toppings, such as granola, crushed nuts, and the like, to enhance flavor and visual appeal. Suitable topping amounts are about 2% to 3% by weight of the final product.

The nutritional snacks of the present invention are made by first mixing the liquid ingredients which comprise corn syrup, the melted confectioner's coating material and the optional wetting agent. The confectioner's coating material is melted by heating it to its melting point or to within about 10° F. above its melting point. The wet ingredients are mixed to obtain substantial homogeneity. Next, the minor dry components are added to the mixed liquids. The minor dry components include the minerals and vitamins, preferably premixed, and the optional salt. Mixing of the minor ingredients with the mixed liquids serves to avoid local concentrations or "hot spots" of the vitamins and minerals in the nutritional bar. The minor dry ingredients are mixed or blended with the mixed liquids to achieve uniform distribution of the minor ingredients throughout the mixed liquids.

The major dry ingredients are then admixed with the mixed liquids and minor dry ingredients to form a substantially homogeneous mixture. The major dry ingredients include the high content carbohydrate components such as sugars and cereal grains. The major dry ingredients also include the high protein content sources such as the peanut proteins, soy proteins, wheat proteins, caseinates, and mixtures thereof.

The flavoring ingredients, such as cocoa or coconut, can be added with the minor dry ingredients or with the major dry ingredients. The major and minor ingredients can be mixed with the liquids in one step. However, adding and mixing the minor ingredients first is preferred to assure avoidance of "hot spots" of the minerals and vitamins in the final product. All mixing can be in the same mixer or blender. Suitable mixing and blending equipment include conventional vertical and horizontal type mixers and blenders.

The mixed ingredients are transferred via conveyor belts and hoppers, for example, to a conventional confectionary-type bar extruder, such as a Werner-Lahara bar extruder having opposing rollers which force the mixture through a die to form the extrudate or core. The extrusion is performed at about room temperature. No cooking or heating during or after extrusion is necessary nor desirable. The preferred extruded shape is a rectangular bar, but other shaped bars, known in the snack bar art, such as cylindrical, and semicylindrical shaped bars can be made using appropriate extruder dies.

The extrudate is cut into individual serving size pieces, by means of a guillotine-type cutter or a wire cutter, for example, in conventional manner. The cut pieces may then be coated, by enrobing, spraying or dipping for example, with a melted confectioner's coating material. The melted coating material may be the same or different from the melted coating material used in forming the liquid mixture from which the core is made. The surface coating is then allowed to cool, preferably by chilling in a cooling tunnel, to solidify the coating material. Temperatures wtihin the cooling tunnel are suitably about 25° F. to about 50° F., preferably about 30° F. to about 40° F. The coated product may be topped with a conventional topping, such as the granola or ground nuts in conventional manner. The extrudate is cut so as to result in a snack of about 70 to 75 g inclusive of any surface coating or topping.

The nutritional bar is then packaged, preferably in a conventional foil laminate food grade packaging film. Packaging in a foil laminate film preserves the moisture content of the bar and prevents it from becoming dry and crumbly over an extended period of time. The interior of the package can be flushed with an inert gas, such as nitrogen, in conventional manner to reduce the oxygen content in the package.

The nutritional bars of the present invention are suitable as snacks for children and adults, hikers skiers, mountain climbers, athletes, and the elderly who wish to be certain their nutritional needs are properly satisfied.

The examples help illustrate the present invention wherein all parts, percentages and proportions are by weight, and all temperatures are in ° F. or at room temperature, unless otherwise indicated:

EXAMPLE 1

In this example, a nutritional bar having a core (or center) and a surface coating is prepared. A topping is not used. The ingredients and their relative amounts are:

| INGREDIENTS OF THE CORE | WEIGHT % (Based Upon Core Weight) |
| --- | --- |
| Peanut protein | 25 |
| Sugars | 8 |
| Rice Cereal | 16 |
| Soy Protein | 6 |
| Vitamin and Mineral Mixture | 4 |
| Salt | 0.5 |
| Corn syrup | 28.5 |
| Molasses | 4 |
| Confectioner's Peanut Butter | 8 |
| Compound Coating (melted) | |
| | 100 |

Bar Size: 71 gram (60 g Center with an 11 g chocolate confectioner's compound coating.

The initial process step in making the nutritional bar comprises mixing the liquid components which comprise the high fructose corn syrup, the peanut butter melted coating, and the molasses. These components are mixed in a conventional mixer.

The next process step calls for adding the minor dry ingredients to the mixed liquids and mixing to obtain substantial homogeneity. The minor dry ingredients are the vitamin and mineral mix and salt.

The third process step in the formation of the nutritional bar is adding the major dry ingredients to the blended composition of the second process step. The major dry ingredients are the sugars, rice cereal, and peanut and soy proteins. These components are mixed to obtain a substantially homogeneous mixture which does not require drying to be shaped or formed. The mixture is fed into a conventional bar machine having opposing rollers for feeding the mixture into a rectangular die. The mixture is extruded at room temperature and atmospheric pressure. No cooking is necessary nor desirable. Neither drying nor molding in a mold under external pressures are needed to obtain form integrity.

As the composition is extruded, the extrudate is cut into individual serving sizes of about 60 gm. The cut pieces (or cores) are each coated with 11 grams of the chocolate confectioner's compound coating. This brings the weight of each nutritional bar up to about 71 gm. The bars each have about 300 calories, 11.4 gm of protein and 0.5 gm of lactose. The caloric distribution of the bar is about 15% from protein, about 54% from carbohydrates, and about 31% from fats. The sucrose, as a percent of calories, is about 14.3%

The nutritional bar is then chilled at about 45° F. in a cooling tunnel and packaged in a foil laminate film.

EXAMPLE 2

A nutritional bar having a core (or center), a surface coating, and a topping is prepared. The ingredients and their relative amounts are:

| INGREDIENTS OF THE CORE | WEIGHT % (Based Upon Core Weight) |
|---|---|
| Oats | 14 |
| Fructose | 6 |
| Caseinates | 11 |
| Flavorings | 4 |
| Wheat Germ | 13 |
| Vitamin and Mineral Mix | 3 |
| Salt | 0.5 |
| Bran | 2.5 |
| Corn Syrup | 25 |
| Partially Hydrogenated Vegetable Oil | 2 |
| Chocolate Confectioner's Compound Coating (melted) | 19 |
| | 100 |

Bar Size: 73 grams (60g center with an 11 g chocolate confectioner's coating and a 2g granola topping The nutritional bar is produced by initially mixing the liquid components which comprise the corn syrup, the melted coating and vegetable oil in a mixer as in Example 1.

Next, the minor dry components as set forth in Example 1 are added to the mixed liquids along with the flavorings. These components are thoroughly mixed with the liquid mixture in order to avoid concentrated portions of these ingredients or hot spots in the nutritional bar.

The third process step in forming the nutritional bar is the addition of the major dry ingredients comprising the bran, wheat germ, fructose, caseinate, and oats. Once these components are thoroughly mixed, they are extruded at room temperature with no cooking. Just as Example 1, the extruded material is cut into 60 gm bars. Each bar is surface coated with 11 grams of the chocolate melted coating. Then 2 gm of granular granola topping is applied over the surface coating of each bar. This yields a serving size of approximately 73 gm, with 300 calories per bar, 11.7 gm of protein, 2 gm of dietary fiber and no lactose.

The caloric distribution for the chocolate granola bar is about 15% from protein, about 55% carbohydrates, and about 30% from fat. Sucrose as a pecentage of the calories is about 14.7%

The bars are then chilled to solidify the coating and packaged in a foil laminate film as set forth in Example 1.

From the foregoing it is apparent that the composition of the nutritional food bar provides a superior food supplement having superior nutritional values and an exceptionally stable shelf life. The present invention is also applicable to the production of extruded, uncooked low lactose nutritional bars which do not contain at least 25% of the recommended daily allowance of all vitamins and minerals, but which, for example, are fortified with at least one heat sensitive material.

What is claimed is:

1. A method of making a nutritional snack comprising:

(a) mixing liquid ingredients including corn syrup and melted confectioner's coating material which is solid at room temperature;
    (b) admixing minor dry ingredients including vitamins and minerals with the liquid ingredients;
    (c) admixing major dry ingredients comprising at least one high protein content source and at least one high carbohydrate content source with the liquid ingredients and minor dry ingredients to obtain a substantially homogeneous mixture;
    (d) shaping at room temperature the substantially homogeneous mixture of step (c) such that said confectioner's coating material is substantially, uniformly distributed throughout said snack; and
    (e) cutting the shaped mixture of step (d) into pieces, the total water content of the liquid ingredients, minor dry ingredients and major dry ingredients being less than or equal to about 10% water by weight and the amount of melted confectioner's coating material being sufficient to provide shape integrity to said shaped pieces, said nutritional snack having a caloric distribution of at least about 10% from proteins, at least about 45% from at least about 25% to about 35% from fats, said percentages totaling 100%, and said nutritional snack having a chewy texture.

2. The method of claim 1, wherein said pieces are coated.

3. The method of claim 1, wherein the percent calories contributed by sucrose is a maximum of about 16% of the total calories.

4. The method of claim 1, in which said snack contains not more than about 1.5% by weight lactose based upon the weight of the snack.

5. The method of claim 1, wherein said snack contains at least about 15% by weight protein based upon the weight of the snack.

6. The method of claim 1, wherein the liquid components are mixed and then all the dry components are added to the mixed liquid components.

7. The method of claim 1, wherein said shaping is conducted at room temperature into a bar shape.

8. The method of claim 7, wherein each of said bars is coated with a topping, chilled and packaged in a foil laminate film.

9. The method of claim 1, wherein the minor dry ingredients and the major dry ingredients are admixed with the liquid ingredients in separate steps.

10. The method of claim 1, wherein the liquid ingredients further include a wetting agent.

11. The method of claim 1, wherein the corn syrup is a high fructose corn syrup.

12. The method of claim 1, wherein said at least one high carbohydrate content source comprises at least one sugar and at least one cereal grain.

13. The method of claim 1, wherein said at least one high protein content source comprises peanut proteins and soy proteins.

14. The method of claim 1, wherein said at least one high protein content source comprises at least one caseinate and wheat protein.

15. The method of claim 10, wherein said wetting agent is partially hydrogenated vegetable oil.

* * * * *